(12) United States Patent
Okamoto et al.

(10) Patent No.: US 7,775,138 B2
(45) Date of Patent: Aug. 17, 2010

(54) WIRE FIXING STRUCTURE

(75) Inventors: Kimio Okamoto, Saitama (JP);
Masahiko Hirata, Saitama (JP);
Shigenori Inaba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 909 days.

(21) Appl. No.: 11/220,906

(22) Filed: Sep. 8, 2005

(65) Prior Publication Data

US 2006/0053947 A1    Mar. 16, 2006

(30) Foreign Application Priority Data

Sep. 13, 2004  (JP) .............................. 2004-265320

(51) Int. Cl.
*F16C 1/10* (2006.01)
(52) U.S. Cl. .................................. 74/500.5
(58) Field of Classification Search ............. 74/500.5, 74/501.6, 502.4, 502.5, 502.6
See application file for complete search history.

(56) References Cited

U.S. PATENT DOCUMENTS

| | | | |
|---|---|---|---|
| 4,102,219 A | * | 7/1978 | Plamper ...................... 74/502 |
| 5,016,843 A | * | 5/1991 | Ward ......................... 248/68.1 |
| 5,467,583 A | * | 11/1995 | Beugelsdyk et al. ......... 56/10.8 |
| 6,260,435 B1 | * | 7/2001 | Morales et al. ............... 74/523 |

FOREIGN PATENT DOCUMENTS

| | | |
|---|---|---|
| JP | 60-110163 | 7/1985 |
| JP | 04-236827 | 8/1992 |
| JP | 09-030226 | 2/1997 |
| JP | 2002-058149 A | 2/2002 |
| JP | 2002-310207 | 10/2002 |
| JP | 2004-82980 A | 3/2004 |

* cited by examiner

*Primary Examiner*—Vicky A Johnson
(74) *Attorney, Agent, or Firm*—Arent Fox LLP

(57) ABSTRACT

A Bowden wire is positioned at two points, that is, at a wire guide bracket and at a through-hole in a back plate between which a notch of an end edge of a plate-shaped trailing arm is interposed. A predetermined preset load is applied to and curves the Bowden wire, wherein the curved Bowden wire is pressed against and fixed to a groove-shaped recess provided in the notch of the trailing arm.

9 Claims, 4 Drawing Sheets

US 7,775,138 B2

WIRE FIXING STRUCTURE

RELATED APPLICATION DATA

The present invention is based upon Japanese priority application No. 2004-265320, which is hereby incorporated in its entirety herein by reference.

BACKGROUND OF THE INVENTION

1. Field of the Invention

The present invention relates to a wire fixing structure for fixing a wire to an end edge of a plate-shaped member, wherein the wire extends from one side of the plate-shaped member via the end edge to the other side of the plate-shaped member.

2. Description of the Related Art

Japanese Patent Application Laid-open No. 2004-82980 discloses a mechanism wherein a parking brake device, provided in a rear wheel, is operated through a Bowden wire by a parking brake lever mounted in a driver's seat, the wire being disposed along a trailing arm of a suspension system for suspending the rear wheel and fixed to the trailing arm via a wire guide bracket.

There is another mechanism wherein a trailing arm includes a plate-shaped member formed by press-forming a steel plate, a grommet mounted in a bore formed in the trailing arm, and a Bowden wire that is passed through the grommet from an inner side of the trailing arm, guided to an outer side of the trailing arm, and connected to a parking brake device.

When the Bowden wire is passed through the grommet mounted in the bore of the trailing arm, the Bowden wire is fixed to the grommet and prevented from moving due to vibration. However, in this case, the operation of passing the Bowden wire through the grommet is troublesome and results in relatively poor working performance.

SUMMARY OF THE INVENTION

Accordingly, it is an aspect of the present invention to easily and reliably fix a wire to an end edge of a plate-shaped member, the wire extending from one side of the plate-shaped member, via the end edge, to the other side of the plate-shaped member.

In order to achieve the above-mentioned aspect, according to a first feature of the invention, there is provided a wire fixing structure for fixing a wire to the end edge of the plate-shaped member, the wire extending from one side of the plate-shaped member, via the end edge, to the other side of the plate-shaped member, wherein the wire is positioned at first and second positioning portions between which the end edge is interposed. By applying a predetermined preset load to a portion of the wire located between the first and second positioning portions, the wire is curved or bent by the predetermined preset load and fixedly pressed against the end edge.

Also, according to a second feature of the invention, in addition to the first feature, a recess, which engages the wire, is formed in the end edge of the plate-shaped member.

A trailing arm in an embodiment corresponds to the plate-shaped member of the present invention; a notch in the embodiment corresponds to the end edge of the present invention; a through-hole in the embodiment corresponds to the second positioning portion of the present invention; a Bowden wire in the embodiment corresponds to the wire of the present invention; and a wire guide bracket in the embodiment corresponds to the first positioning portion of the present invention.

With the arrangement of the first feature, the wire is positioned at the first and second positioning portions between which the end edge of the plate-shaped member is interposed. A predetermined preset load is then applied to a portion of the wire located between the first and second positioning portions, wherein the wire is curved by the preset load and fixedly pressed against the end edge. Therefore, it is unnecessary to insert the wire through a bore formed in the plate-shaped member and fix the wire to the bore, which improves and simplifies the assembly process of the wire fixing structure. Furthermore, the present invention makes it unnecessary to mount a special fixing member for fixing the wire to the end edge of the plate-shaped member, which results in a reduction in the number of components.

With the arrangement of the second feature, the recess which engages the wire is formed in the end edge of the plate-shaped member, and displacement of the wire is effectively prevented.

The above-mentioned aspect, other aspects, characteristics, and advantages of the present invention will become apparent from the following embodiment, which will be described in detail below by reference to the attached drawings.

DETAILED DESCRIPTION OF PREFERRED EMBODIMENT

Figure 1:
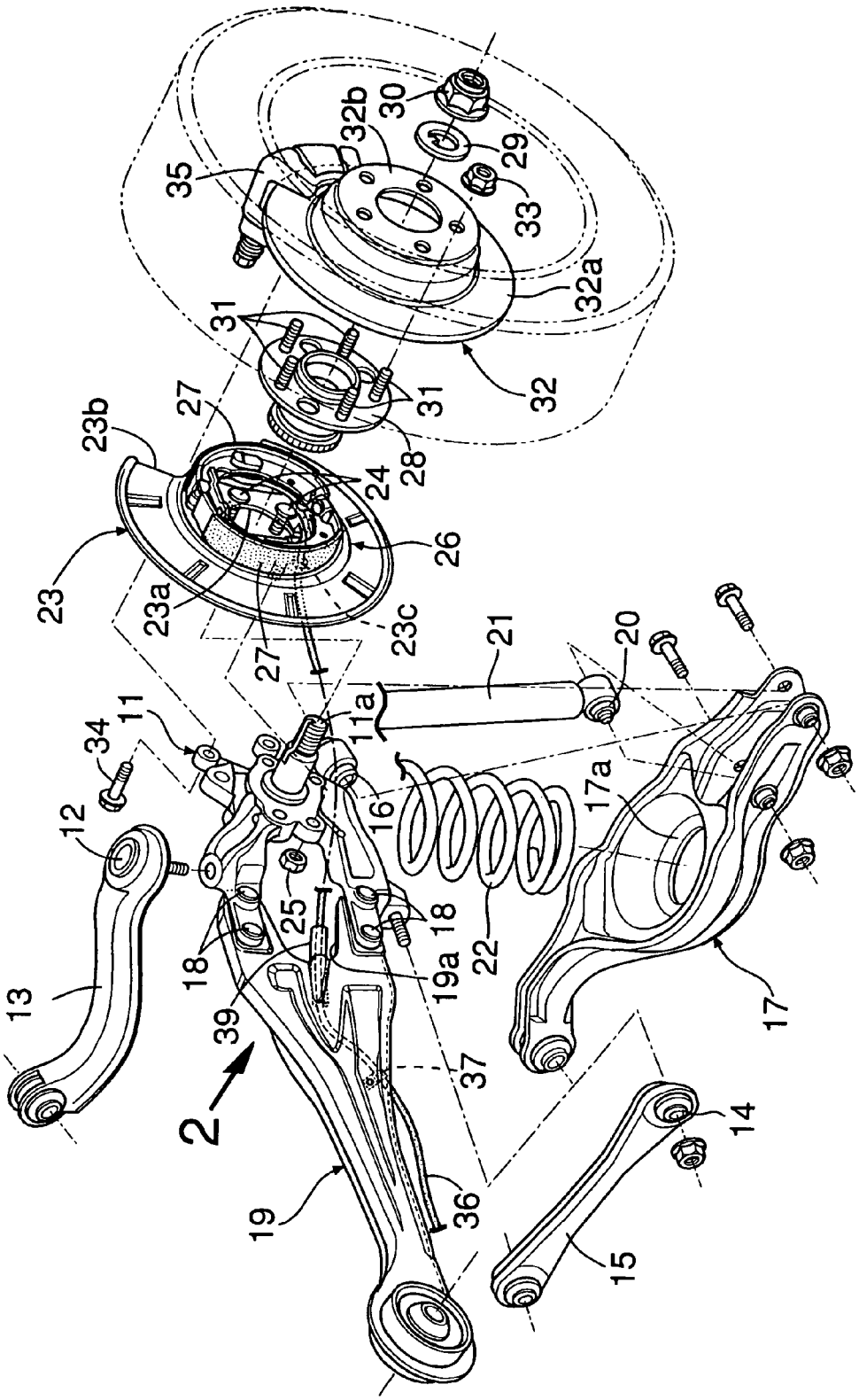
FIG. 1 is an exploded perspective view of a suspension system for a wheel of an automobile, including a wire fixing structure according to an embodiment of the present invention.

As shown in FIG. 1, a suspension system for a wheel, such as, for example only, a left rear wheel, of an automobile includes a knuckle 11 integrally provided with an axle 11a. An upper arm 13 connects an upper portion of the knuckle 11 through a ball joint 12 to a vehicle body. A front lower arm 15 connects a front lower portion of the knuckle 11 through a rubber bush joint 14 to the vehicle body. A rear lower arm 17 connects a rear lower portion of the knuckle 11 through a rubber bush joint 16 to the vehicle body. A trailing arm 19, which is fixed by bolts 18 to a front portion of the knuckle 11, extends forward from the front portion, and is connected to the vehicle body. A damper 21 is connected, through a rubber bush joint 20, to the rear lower arm 17 at a position near a tip end of the rear lower arm 17. A suspension spring 22, supported on a spring seat 17a, is provided at an intermediate portion of the rear lower arm 17.

Figure 2:
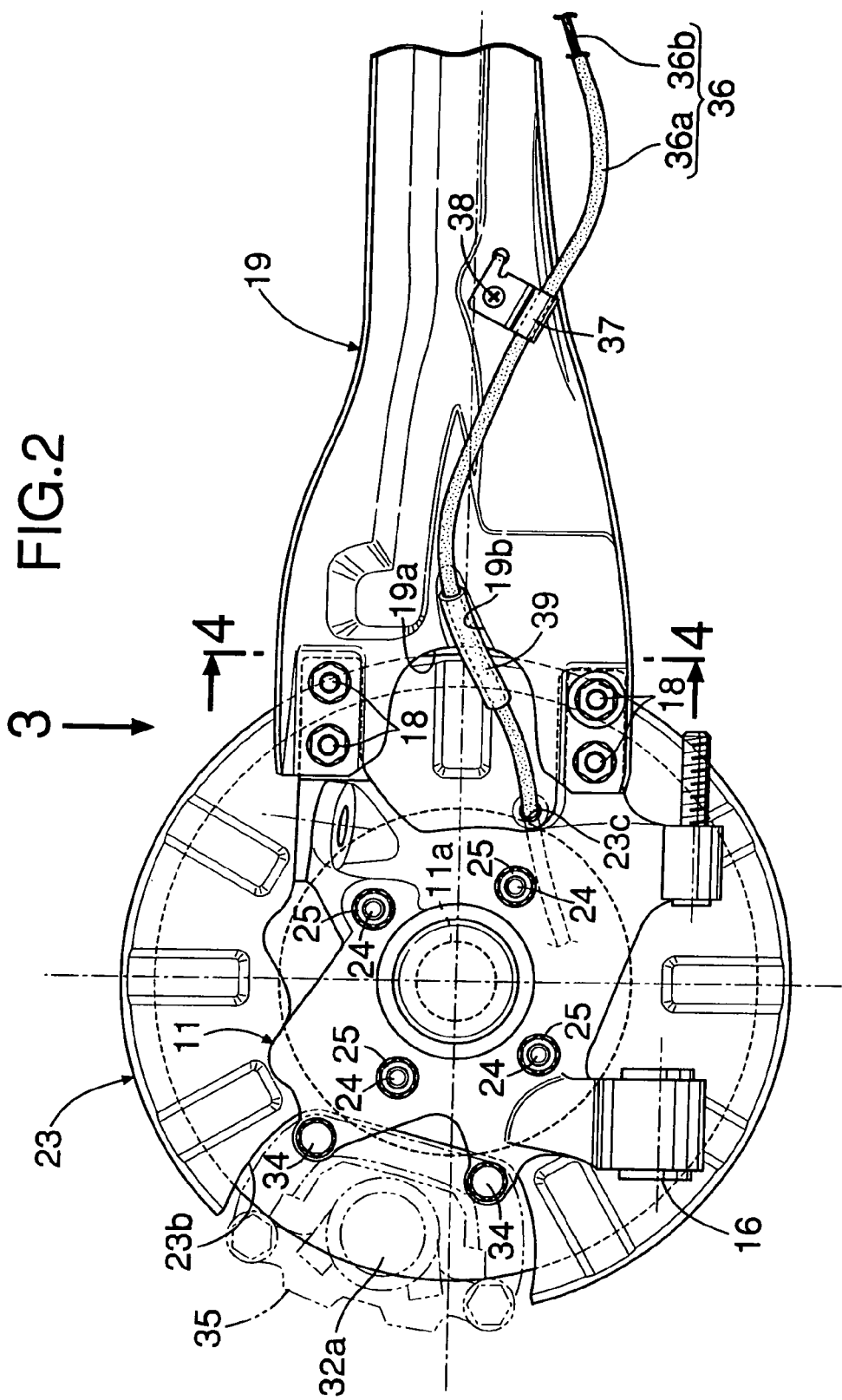
FIG. 2 is a view of a portion of the assembled suspension system taken in a direction of an arrow 2 in FIG. 1.
Figure 3:
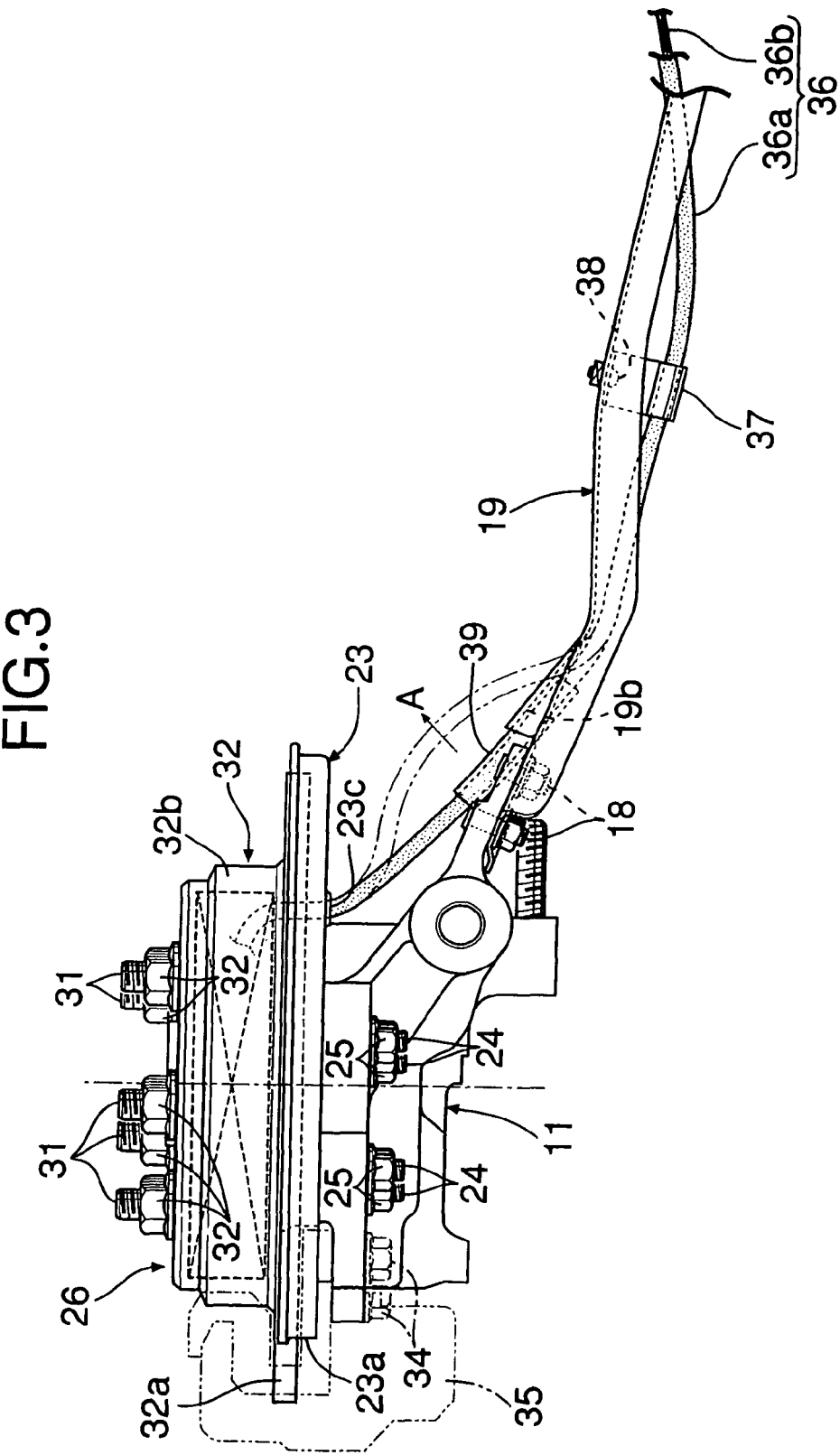
FIG. 3 is a view of a portion of the assembled suspension system taken in a direction of an arrow 3 in FIG. 2.
Figure 4:
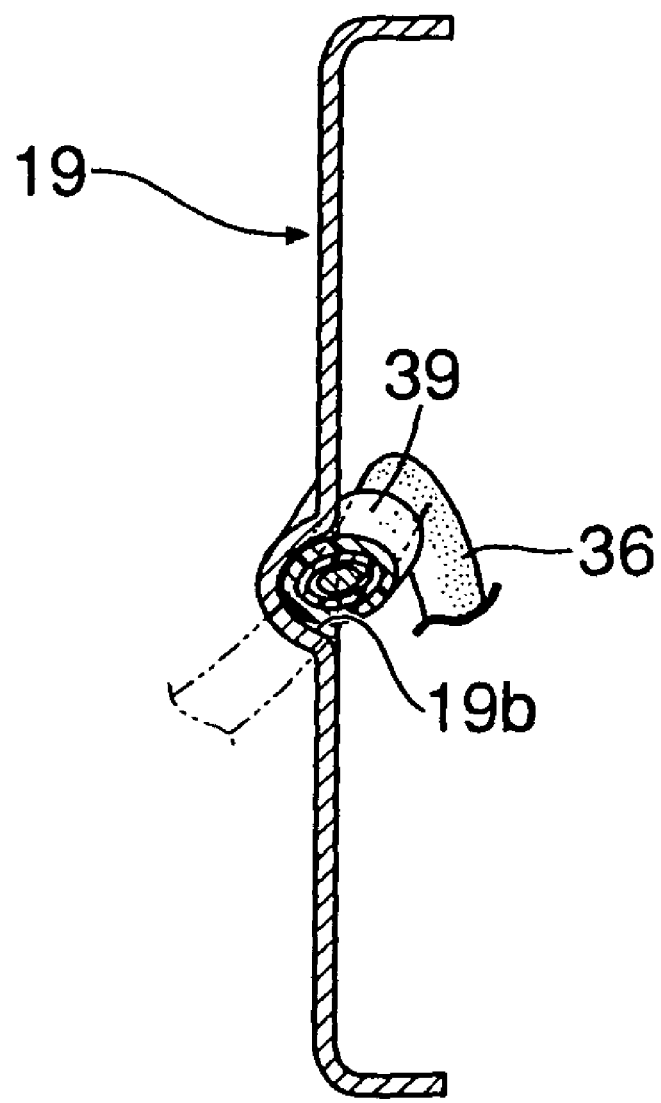
FIG. 4 is a sectional view taken along a line 44 in FIG. 2.

As can be seen from FIGS. 1 to 3, wherein a circular opening 23a, formed at a center of a back plate 23, is loosely fitted over the axle 11a of the knuckle 11, a plurality of, e.g., four, stud bolts 24, provided on the back plate 23, are passed through the knuckle 11 and fastened by nuts 25 thereto. A pair of brake shoes 27, 27 of a drum brake 26, functioning as a parking brake device, are swingably supported on an outer side of the back plate 23.

A hub unit 28, housing a ball bearing, is passed through the opening 23 in the back plate 23, and fitted over and fixed to the axle 11a of the knuckle 11 by a washer 29 and a spindle nut 30. A plurality, e.g., five, of stud bolts 31, provided on the hub unit 28, are passed through a brake disk 32 and fastened by nuts 33 thereto. The brake disk 32 includes a disk portion 32a and a drum portion 32b. The disk portion 32a is exposed from a notch 23b formed in the back plate 23. The pair of brake shoes 27, 27 are abuttingly opposed to an inner peripheral surface of the drum portion 32b.

A brake caliper 35 is fixed by two bolts 34, 34 to a rear portion of the knuckle 11 and is disposed to clamp the disk portion 32a of the brake disk 32 exposed from the notch 23b of the back plate 23.

As can be seen from FIGS. 1 to 4, a Bowden wire 36, for operating the drum brake 25, includes an outer tube 36a and an inner cable 36b slidably accommodated within the outer tube 36a. The inner cable 36b is connected at one end to a parking brake lever (not shown), and at the other end to a cam member (not shown) for driving the pair of brake shoes 27, 27.

The trailing arm 19 is manufactured by press-forming a steel plate and includes a U-shaped notch 19a at a rear end and a groove-shaped recess 19b extending forward from a bottom of the notch 19a. The Bowden wire 36, extending rearward along an inner side of the trailing arm 19, is passed via the notch 19a in the trailing arm 19 to an outer side of the trailing arm 19, and then guided through a through-hole 23c in the back plate 23 into the drum brake 26.

The Bowden wire 36 is fixed to the inner side face of the trailing arm 19 by a wire guide bracket 37 and a bolt 38. Therefore, the Bowden wire 36 is positioned in front of the notch 19a of the trailing arm 19 by the wire guide bracket 37 and is fitted into, and positioned at, the through-hole 23c in the back plate 23 in the rear of the notch 19a. A pipe-shaped protector 39, fitted over an outer periphery of the Bowden wire 36, is engaged into, and non-movably fixed, in the recess 19b of the notch 19a of the trailing arm 19 between the wire guide bracket 37 and the through-hole 23c in the back plate 23.

Thus, the Bowden wire 36, having a resiliency, is positioned at the two points by the wire guide bracket 37 and the through-hole 23c in the back plate 23. A preset load is then forcibly applied to curve the Bowden wire 36 which is rectilinear in a free state. The Bowden wire 36 tends to be curved by the preset load in a direction of an arrow A in FIG. 3, and is resiliently pressed against the recess 19b of the notch 19a in the trailing arm 19 and fixed thereto, wherein the Bowden wire 36 becomes non-movably fixed.

The direction and magnitude of the preset load on the Bowden wire 36 are easily adjusted merely by changing the shape, fixing the angle, fixing the position, and the like, of the wire guide bracket 37. Therefore, the Bowden wire 36 can be pressed with any strength to the recess 19b of the notch 19a in the trailing arm 19.

In this manner, in fixing the Bowden wire 36, it is unnecessary to insert the Bowden wire 36 through a bore formed in the trailing arm 19 and/or to use a special fixing member to fix the Bowden wire 36 to the notch 19a of the trailing arm 19.

Although a preferred embodiment of the present invention has been described above, various modifications in the design may be made without departing from the spirit, scope, and subject matter of the present invention.

For example, the structure of fixing the Bowden wire 36 to the trailing arm 19 of the suspension system for the automobile has been illustrated in the embodiment, but the present invention is applicable to a structure of fixing any wire to any plate-shaped member.

What is claimed is:

1. A wire fixing structure for fixing a wire, comprising:
a plate-shaped member having an end edge, wherein the wire extends from a first side of the plate-shaped member to a second side via the end edge, wherein the end edge extends between the first and second sides of the plate-shaped member; and
first and second positioning portions,
wherein the end edge is disposed between the first and second positioning portions, wherein the wire is positioned at the first and second positioning portions so as to be applied with a predetermined preset load at a portion of the wire disposed between the first and second positioning portions, and wherein the predetermined preset load curves the portion of the wire disposed between the first and second positioning portions and the wire is resiliently pressed against and fixed to the end edge.

2. The wire fixing structure according to claim 1, further comprising a recess extending from the intermediate portion of the end edge in a direction that is away from a direction of first and second edges of the end edge, wherein the recess engages the wire.

3. The wire fixing structure according to claim 2, wherein the end edge includes a notch.

4. The wire fixing structure according to claim 3, further comprising a pipe-shaped protector fitted over an outer periphery of the wire, wherein the protector is engaged, and non-movably fixed, in the notch between the first and second positioning portions.

5. The wire fixing structure according to claim 1, wherein the first positioning portion is a wire guide bracket fixed to an inner side face of the plate-shaped member.

6. The wire fixing structure according to claim 1, wherein the wire is a Bowden wire and the plate-shaped member is a trailing arm.

7. The wire fixing structure according to claim 6, wherein the Bowden wire includes a cable accommodated within an outer tube.

8. The wire fixing structure according to claim 1, wherein the end edge of the plate-shaped member is U-shaped and has opposing first and second edges extending from corresponding first and second ends of an intermediate portion, and wherein the wire extends along the first side of the plate-shaped member and then extends along the second side of the plate-shaped member that is defined on an opposite surface of the plate-shaped member after passing over the intermediate portion of the end edge.

9. The wiring fixing structure according to claim 1, wherein the plate-shaped member is for mounting to a vehicle body and is provided with a recess formed at the end edge, and wherein the first and second positioning portions are provided at positions between which the recess is located, the second positioning portion being at a position lower than the recess with respect to the vehicle body and the wire is resiliently pressed against the recess.

* * * * *